… …

United States Patent Office 2,884,330
Patented Apr. 28, 1959

2,884,330

PAINT VEHICLE WITH FUNGICIDAL PROPERTIES

Leo A. Goldblatt and Lucien L. Hopper, Jr., New Orleans, La., assignors to the United States of America as represented by the Secretary of Agriculture No Drawing. Application October 3, 1956
Serial No. 613,796

6 Claims. (Cl. 106—15)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of paint and varnish vehicles. More particularly the invention relates to the preparation of paint and varnish vehicles that possess "built-in" fungicidal properties, that is, in which the fungicide is chemically bound to a film-forming component of the vehicle. "Built-in" fungicidal properties are attained according to the process of this invention by integrally incorporating, as the fungicidal moiety, certain organic groups, such as, the propionyl radical from tripropionin or the undecylenyl radical from undecylenic acid by ester interchange, or hexachlorocyclopentadiene by Diels-Alder addition into a conventional vehicle containing tung oil or tung oil fatty acids during preparation of the vehicle.

It is a well recognized fact that conventional paint and varnishes possess little or no resistance to the action of fungi. Therefore, as one means of attaining some semblance of mildew resistance in protective coatings it is customary to incorporate, as a separate entity after the paint or varnish vehicle has been prepared, some material (i.e. a heavy metal such as copper, zinc, mercury, lead or compounds of these elements or organic compounds) which of itself possesses fungicidal properties. Such a method is only moderately successful and is, for some purposes, undesirable. In the case of coatings containing fungicidal components as additives, the fungicidal material is dispersed throughout the coating with no real chemical bonding between the fungicidal additive and the complex homogeneous organic mass that makes up the vehicle. This means that fungicidal activity is limited to those particular portions of the protective coating where the additive happens to be located. The additive, moreover, being a quite separate component insofar as the vehicle itself is concerned, is free to separate, migrate, and disappear entirely from the applied coating once the finished coating has been spread in a thin layer over the surface being protected. It is a well known fact that finely divided metallic mercury, for example, is characterized by an extremely high vapor pressure and in the case of its (mercury) presence as a finely divided additive in a protective coating, rapid loss by volatilization would be certain. Migration or loss by volatilization, leaching, or mechanical abrasion constitute serious disadvantages in the case of organic fungicidal additives. The problem is best exemplified in the case of paint and varnish vehicles formulated for the purpose of protecting surfaces in the interiors of food factories. Humidity, temperature, and nutritional conditions in food factories are ideal for mold and fungus growth, but in these particular locations, the use of paints that incorporate toxic components is clearly undesirable. A recently published statement concerning the problem of fungicidal paint preparation is to be found in the American Paint Journal for September 19, 1955, pages 80–90.

A primary object of the present invention is to provide paint and varnish vehicles which have incorporated in the vehicles themselves, as an inseparable constituent, an integral fungicidal component.

A typical paint or varnish vehicle without fungicidal properties may be prepared employing the following procedure:

One hundred parts of resin (i.e., a pentaerythritol ester of maleic modified rosin) and 240 parts of a drying oil (i.e. linseed oil, varnish maker's grade) are heated together to about 585° F. and held at this temperature until a requisite bodying (increase in viscosity) has occurred. The heated mass is allowed to cool to about 350° F. and then thinned with mineral spirits to about 50% solids. Such a product with subsequent incorporation of driers constitutes a varnish or such a product "thinned" following incorporation of a pigment and driers constitutes a paint (enamel). Either product would not normally possess any fungicidal properties. As stated earlier, one method of gaining some semblance of resistance to fungicidal attack in a conventional paint or varnish vehicle prepared as described above would be to incorporate as an additive to the finished vehicle some heavy metal or the salts thereof or some organic additive. This operation, of course, will give rise to the undesirable effects recited earlier.

We have discovered that paint and varnish vehicles that possess "built-in" fungicidal properties can be prepared by integrally incorporating certain organic compounds, such as, tripropionin or undecylenic acid by ester interchange, or hexachlorocyclopentadiene by Diels-Alder addition in a conventional vehicle containing tung oil or tung oil fatty acids during preparation of the vehicle. The fungicidal properties so produced are an inherent characteristic of the homogeneous mass that goes to make up the finished vehicle. Furthermore, the "built-in" fungicidal properties will remain in the homogeneous mass even after the vehicle is transformed into a paint or a varnish, applied to a surface, and finally develops into a protective coating. Fungicidal activity in such a coating is as continuous as the coating itself and is not limited to isolated areas of the coating as is the case when fungicidal additives are put into a paint or varnish simply by mechanical mixing. Migration of the fungicidal entity within a paint film prepared according to our invention is impossible.

In general, in accordance with the present invention, paint and varnish vehicles that possess "built-in" fungicidal properties are produced by heating for the usual time and at the usual temperature required to produce requisite bodying (increase in viscosity) a resin, drying oil, and/or drying oil fatty acids and tripropionin. Subsequent to heat bodying, the vehicle so produced can be mixed with any of the solvents customarily used for "thinning" purposes in the varnish industry and driers can be added. In the heat bodying operation, the procedures and apparatus customarily used in the paint and varnish making art to produce conventional vehicles can be employed. The paint and varnish vehicles provided by this invention are unique in that the fungicidal characteristics have been incorporated into the finished homogeneous mass as an inseparable constituent, held by chemical bonding and therefore not subject to removal from the homogeneous mass that constitutes the finished paint or varnish vehicles by volatilization, preferential attack by solvents, oxidation, or any mechanical processes such as weathering or scrubbing. The following examples are illustrative of the details of practicing the present invention.

EXAMPLE 1

A vehicle prepared by heating together 60 parts of a resin (Epon 1004), 20 parts of tung oil fatty acids, which usually contain about 75% by weight of eleostearic acid, and 6.5 parts of tripropionin for one half hour at 425° F. gave a product with an acid number of 5.0 (this indicates that practically all of the free fatty acids had reacted and that ester interchange had taken place). This product when thinned to 50% solids with xylene and mixed with a cobalt-lead naphthenate drier produced a satisfactory dried film. It "dried to touch" in ¾ of an hour, and was mildew resistant when tested using the standard method (Engineering, Research and Development Laboratories, Fort Belvoir, Virginia, Report No. 1118).

Epon 1004, used in this example, has the structural formula,

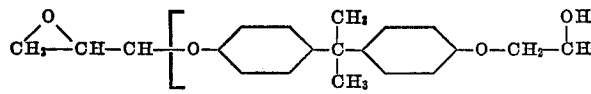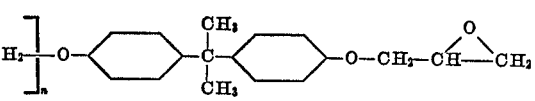

where n=4, according to Shell Chemical Corp. Technical Publication SC: 54–46.

The standard testing procedure employed in all of the examples is as follows: Whatman filter paper was coated on both sides with the test material and allowed to dry for 48 hours; the filter paper was then cut into 1¼" squares and ruled on all sides with India ink ⅛ of an inch from the edge. Each filter paper square thus prepared was placed in a Petrie dish of nutrient agar; and the paper and agar subsequently inoculated with 1.5 milliliters of a suspension of spores of the test organisms. Three replicate dishes were used for each organism. The organisms were *Aspergillus niger* (ATCC #10535) and *Aspergillus oryzae* (ATCC #10196). The growth after seven, and after ten days was estimated numerically according to the following key and the results of three replicate plates were averaged.

Key (1) No mold growth or any portion of the sample within the lined area.

(2) Slight mold growth on any portion of the sample within the lined area.

(3) Moderate mold growth on any portion of the sample within the lined area.

(4) Heavy mold growth on any portion of the sample within the lined area.

The vehicle prepared as described under Example 1 showed fungicidal resistance according to the above key with *Aspergillus oryzae* of 1.5, with *Aspergillus niger* 2.6. This is good protection.

EXAMPLE 2

A vehicle prepared and tested as in Example 1 but having only 2.5 parts of tripropionin rather than 6.5 as in Example 1 showed considerably less fungicidal protection. According to the key fungicidal resistance to *Aspergillus oryzae* 2.3, to *Aspergillus niger* 4.0.

EXAMPLE 3

A vehicle prepared and tested as above except with no tripropionin showed practically no fungicidal protection. The rating with *Aspergillus oryzae* was 3.8, with *Aspergillus niger* 4.0.

EXAMPLE 4

A vehicle prepared and tested as in the above examples but with tripropionin being replaced with 5 parts of hexachlorocyclopentadiene produced a clear film dry to touch in ¾ of an hour. The fungicidal properties of this vehicle were good. The numerical rating with *Aspergillus oryzae* was 1.5, with *Aspergillus niger* 2.5.

EXAMPLE 5

A vehicle prepared and tested as in Example 1 but with triproprionin being replaced with 14 parts of undecylenic acid produced a clear film dry to touch in ¾ of an hour. The fungicidal properties of this vehicle were fair. The numerical rating with *Aspergillus oryzae* was 3.0 after 10 days.

EXAMPLE 6

A vehicle prepared and tested as above but containing only raw tung oil 25 parts and linseed oil 75 parts as ingredients showed no fungicidal protection at all. The numerical rating with *Aspergillus oryzae* 3.3, with *Aspergillus niger* 4.0.

We claim:

1. A fungicidal paint and varnish comprising, as the film-forming component thereof, a film-forming resin containing chemically available hydroxyl groups and a film-forming ester of an organic fungicide selected from the group consisting of tripropionin and undecylenic acid with a member selected from the group consisting of a drying oil, drying oil fatty acids, and mixtures thereof.

2. The paint and varnish of claim 1 wherein the organic fungicide is tripropionin.

3. The paint and varnish of claim 1 wherein the organic fungicide is undecylenic acid.

4. A fungicidal paint and varnish comprising a thinner, a drier, and, as the film-forming component thereof, a film-forming resin containing chemically available hydroxyl groups and a film-forming transesterification reaction product of tung oil fatty acids with tripropionin.

5. A fungicidal paint and varnish comprising a thinner, a drier, and, as the film-forming component thereof, a film-forming resin and a film-forming transesterification reaction product of tung oil fatty acids with undecylenic acid.

6. The method of producing a fungicidal paint and varnish wherein the vehicle comprises a fungicidal film-forming component which method comprises heating an organic fungicide selected from the group consisting of tripropionin and undecylenic acid with a mixture of a film-forming resin containing chemically available hydroxyl groups and a material selected from the group consisting of a drying oil, drying oil fatty acids, and mixtures thereof to produce a homogeneous fungicidal film-forming ester of said organic fungicide and said material selected from the group consisting of a drying oil, drying oil fatty acids, and mixtures thereof.

References Cited in the file of this patent

UNITED STATES PATENTS

| | | |
|---|---|---|
| 2,292,323 | Ingle | Aug. 4, 1942 |
| 2,403,945 | Musser | July 16, 1946 |
| 2,615,159 | Jackson | Oct. 21, 1952 |
| 2,808,421 | Brokaw | Oct. 1, 1957 |